(12) United States Patent
Bradley et al.

(10) Patent No.: US 9,379,817 B2
(45) Date of Patent: Jun. 28, 2016

(54) PLUG AND PLAY OPTICAL TRANSCEIVER MODULE FOR ELECTRONIC DEVICES

(71) Applicant: CORNING OPTICAL COMMUNICATIONS LLC, Hickory, NC (US)

(72) Inventors: Mark Alan Bradley, Hickory, NC (US); Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/508,284

(22) Filed: Oct. 7, 2014

(65) Prior Publication Data

US 2015/0023671 A1     Jan. 22, 2015

Related U.S. Application Data

(63) Continuation of application No. PCT/US2013/038157, filed on Apr. 25, 2013.

(60) Provisional application No. 61/639,326, filed on Apr. 27, 2012.

(51) Int. Cl.
*H04B 10/40* (2013.01)
*G02B 6/38* (2006.01)
*G02B 6/42* (2006.01)

(52) U.S. Cl.
CPC .............. *H04B 10/40* (2013.01); *G02B 6/4293* (2013.01); *G02B 6/3817* (2013.01); *G02B 6/3885* (2013.01); *G02B 6/4206* (2013.01); *G02B 6/4214* (2013.01); *Y10T 29/49133* (2015.01)

(58) Field of Classification Search
CPC ............. H04B 10/40; Y10T 29/49133; G02B 6/3817; G02B 6/3885; G02B 6/4206
USPC ........................ 398/134, 138, 164; 385/14, 53
See application file for complete search history.

(56) References Cited

U.S. PATENT DOCUMENTS 6,206,582 B1 * 3/2001 Gilliland .............. G02B 6/4277
                                                           385/139
6,863,448 B2    3/2005 Chiu et al. ...................... 385/88

(Continued)

FOREIGN PATENT DOCUMENTS

AU    199898138 B2    8/1999    ............... G02B 6/32
CN    1651953         8/2005

(Continued)

OTHER PUBLICATIONS

Applications of GRIN-rod lenses in optical fiber communication systems, W. J. Tomlinson, Applied Optics, vol. 19, No. 7, Apr. 1, 1980, 12 pages.

(Continued)

*Primary Examiner* — Dalzid Singh

(57) ABSTRACT

Disclosed are optical transceiver modules for use with electronic devices. In one embodiment, an optical transceiver module has a circuit board assembly for receiving and transmitting optical signals with a connector shell that is attached to the circuit board so that the circuit board is disposed outside the shell. The optical transceiver module also includes a faceplate that may have one or more attachment features for securing the faceplate and/or optical transceiver module to a device. By arranging the circuit board outside the shell of the optical transceiver module the footprint of the module is greatly reduced, thereby providing an advantageous arrangement for fitting into electronic devices having a relatively thin profile. Further, the optical transceiver module may optionally include one or more electrical contacts.

20 Claims, 15 Drawing Sheets

(56) References Cited

U.S. PATENT DOCUMENTS

| | | | | |
|---|---|---|---|---|
| 2005/0083670 | A1* | 4/2005 | Peloza | G02B 6/4201 361/801 |
| 2005/0099782 | A1* | 5/2005 | Kim | G02B 6/3897 361/740 |
| 2009/0016685 | A1* | 1/2009 | Hudgins | H04B 10/40 385/92 |
| 2009/0275230 | A1* | 11/2009 | Priyadarshi | G02B 6/4201 439/370 |
| 2010/0310213 | A1 | 12/2010 | Lewallen et al. | 385/75 |
| 2011/0229078 | A1 | 9/2011 | Isenhour et al. | 385/33 |
| 2011/0229089 | A1 | 9/2011 | Isenhour et al. | 385/78 |
| 2011/0229090 | A1 | 9/2011 | Isenhour et al. | 385/78 |
| 2011/0229093 | A1 | 9/2011 | McColloch | 385/92 |
| 2012/0195556 | A1 | 8/2012 | Wang et al. | 385/77 |
| 2015/0268425 | A1* | 9/2015 | de Jong | G02B 6/4214 385/33 |

FOREIGN PATENT DOCUMENTS

| | | | |
|---|---|---|---|
| CN | 101266324 | 9/2008 | |
| DE | 19710572 A1 | 9/1998 | G02B 6/42 |
| EP | 1503232 A1 | 2/2005 | G02B 6/42 |
| JP | 63-293510 A | 11/1988 | G02B 6/32 |
| WO | WO 01/11409 A2 | 2/2001 | G02B 23/24 |
| WO | WO 03/076993 A1 | 9/2003 | G02B 6/32 |

OTHER PUBLICATIONS

Analysis and Evaluation of Graded-Index Fiber-Lenses, William L. Emkey et al., Journal of Lightwave Technology, vol. LT-5, No. 9, Sep. 1987, 9 pages.

Fiber coupling using graded-index rod lenses, Joseph C. Palais, Applied Optics, vol. 19, No. 12, Jun. 15, 1980, 8 pages.

Gradient-Index Lenses, Melles Griot Optical Components Specification Sheet, 4 pages.

Design and demonstration of a multicore single-mode fiber coupled lens device, P. Chanclou et al., Optics Communications 233, Jan. 23, 3004, 7 pages.

Misalignment losses at multimode graded-index fiber splices and GRIN rod lens couplers, J. M. Senior et al., Applied Optics, vol. 24, No. 7, Apr. 1, 1985, 7 pages.

Single-mode fiber coupling efficiency with graded-index rod lenses, Robert W. Gilsdorf, Applied Optics, vol. 33, No. 16, Jun. 1, 1994, 6 pages.

Angular tilt misalignment loss at a GRIN rod lens coupler, Stewart D. Cusworth et al, Applied Optics, vol. 25, No. 11, Jun. 1, 1986, 5 pages.

PCT International Search Report and Written Opinion issued in corresp. PCT Appln. PCT/US2013/038157, dated Jul. 24, 2013.

EP 161 Communication issued in corresp. EP Appln. 13722631.2, dated Jan. 16, 2015.

CN Official Action and Search Report issued in corresp. CN Appln. 201380022412.9 dated Aug. 17, 2015.

* cited by examiner

PLUG AND PLAY OPTICAL TRANSCEIVER MODULE FOR ELECTRONIC DEVICES

PRIORITY

This application is a continuation of International Application No. PCT/US13/38157 filed Apr. 25, 2013, which claims the benefit of priority to U.S. Application No. 61/639,326, filed Apr. 27, 2012, both applications being incorporated herein by reference.

BACKGROUND

The disclosure is directed to optical transceiver modules for use in electronic devices. More specifically, the disclosure is directed to optical transceiver modules that may be installed into a port of the electronic device.

As electronic devices move toward operation at faster data rates the electrical interfaces on these devices along with the electrical transmission cables will reach their bandwidth capacity limitations. Additionally, the electronic devices are trending to smaller and thinner footprints.

Conventional optical transceivers modules are known that are designed for data center applications to enable relatively high data speed transfer. These conventional optical transceivers are housed within cages or shells so that the transceivers can be inserted and secured into equipment and locked into place. In other words, the components of the conventional transceivers are contained within the cages or shells. Moreover, the cages or shells provide an outer framework for inserting the module into a respective port for attaching the module to the desired equipment. Thus, conventional optical transceivers are relatively large and bulky devices.

Consequently, there is an unresolved need for optical interfaces that may be used for relatively small devices like typical consumer applications such personnel devices such as smart phones, tablets and other consumer devices that have a relatively small footprint. The concepts disclosed herein solve this unresolved need for optical interfaces for small form-factor devices.

SUMMARY

The disclosure is directed to optical transceiver modules that are suitable for insertion into a port of a device such as smart phones, tablets and other devices. One embodiment of the disclosure is directed to an optical transceiver module having a circuit board assembly for receiving and transmitting optical signals. The circuit board assembly include a circuit board and a connector shell that is attached to the circuit board so that the circuit board is disposed outside the shell. The optical transceiver module also includes a faceplate. By arranging the circuit board outside the shell of the optical transceiver module the footprint of the module is greatly reduced, thereby providing an advantageous arrangement for fitting into electronic devices having a relatively thin profile. Further, the optical transceiver module may optionally include one or more electrical contacts or the faceplate may have at least one attachment feature for securing the faceplate and/or the optical transceiver module to a device. However, the attachment feature may be disposed on other portions of the optical transceiver module such as the connector shell.

Another embodiment of the disclosure is directed to an optical transceiver module having a circuit board assembly for receiving and transmitting optical signals. The circuit board assembly includes a circuit board and with one or more active devices such as at least one laser such as a VCSEL and at least one photodiode. A connector shell is attached to the circuit board assembly so that the circuit board is disposed outside the connector shell, and the connector shell may have a first lobe and a second lobe separated by a pocket. An optical module such as a total internal reflection (TIR) module is disposed in the pocket of the connector shell and the TIR module may include a plurality of GRIN lenses or integrally formed lenses as desired. The optical transceiver module also includes a faceplate having at least one attachment feature for securing the optical transceiver module to a device. The connector shell may be arranged so that an open side of the pocket is adjacent the circuit board. Further, the optical transceiver module may optionally include one or more electrical contacts. In other embodiments, the connector shell may have a pocket without lobes with or without electrical contacts.

The disclosure is also directed to method for making an optical transceiver module including providing a circuit board assembly having a circuit board and one or more active components, aligning an optical module so it is in optical communication with one or more active components, and attaching a connector shell to the circuit board assembly so that the circuit board is disposed outside the connector shell. Other methods may further include attaching the connector shell so that a pocket of the connector shell is disposed about the optical module, attaching a plurality of GRIN lenses to the optical module, or attaching the connector shell so that first electrical contact is disposed within a first lobe of the connector shell and a second electrical contact is disposed within a second lobe of the connector shell.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the preferred embodiments of the disclosure, examples of which are illustrated in the accompanying drawings. Whenever possible, like reference numbers will be used to refer to like components or parts.

The optical transceiver modules disclosed herein enable high-speed data applications for transmitting optical signals to electronic devices such as speeds of 5 GB/sec or greater along with having a relatively small and compact footprints so that they are useful for use with electronic devices such as consumer devices and the like. The optical transceiver module may be inserted into a port of the electronic device so it can receive optical signals for conversion into electrical signals and vice versa for transmitting signals. In order to transmit/receive optical signals, the optical transceiver modules may include an optical module for directing the optical signals such as a total internal reflection (TIR) module that may include one or more lenses. The one or more lenses of the optical module are used for collimating or focusing the light from the transmission channel that is optically coupled to a laser such as a vertical-cavity surface-emitting laser (VCSEL) to an optical fiber in a complementary cable assembly, and from the optical fiber in the complementary cable assembly to a receive channel of the optical module that is optically coupled to an active element such as a photodiode or the like. The optical transceiver modules may include a faceplate having at least one attachment feature for securing the optical transceiver module to the port of the electronic device. In certain embodiments, the optical transceiver modules have a footprint with a width that is greater than the height. The optical transceiver has a circuit board with a relatively short length that makes an electrical connection with the electronic device when installed. Consequently, the optical transceiver modules provide plug and play connectivity with a footprint that is advantageous for use with electronic devices having thin and compact profiles and the like.

Figure 1:
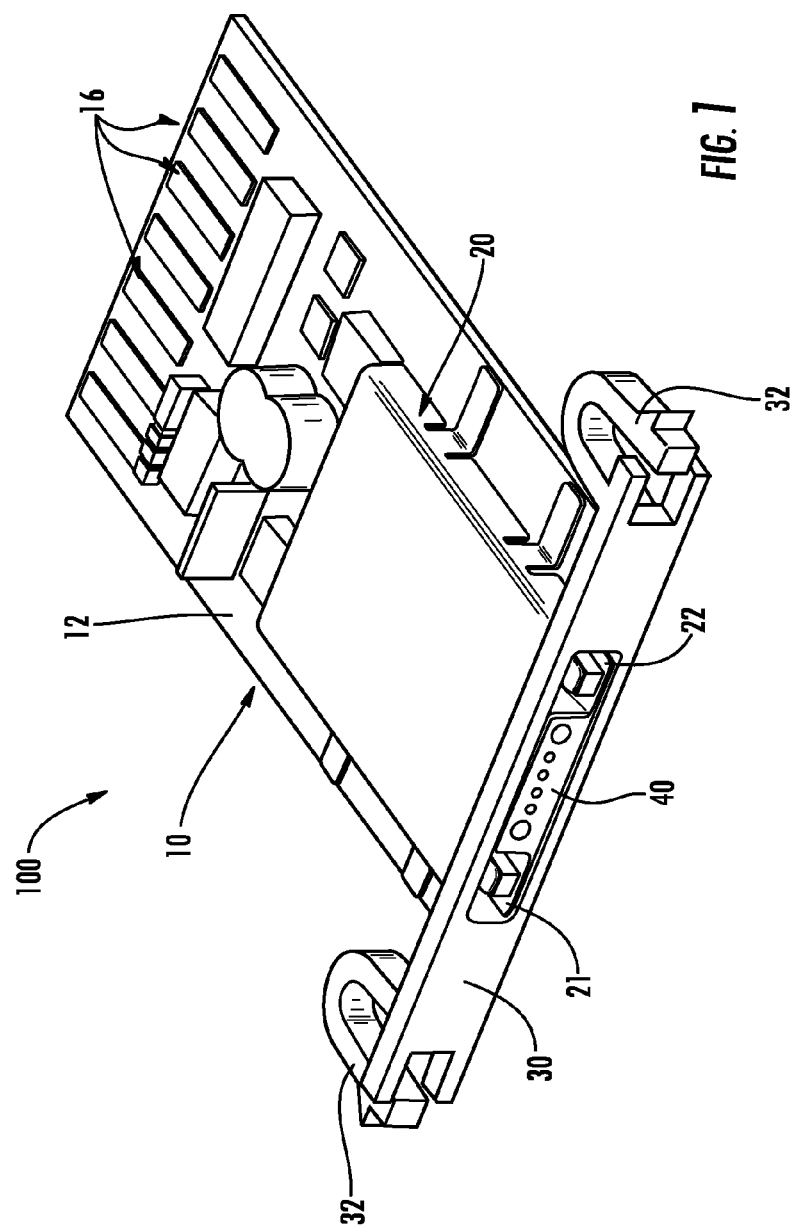
FIGS. 1 and 2 are perspective views of an explanatory optical transceiver module according the concepts disclosed herein.
Figure 2:
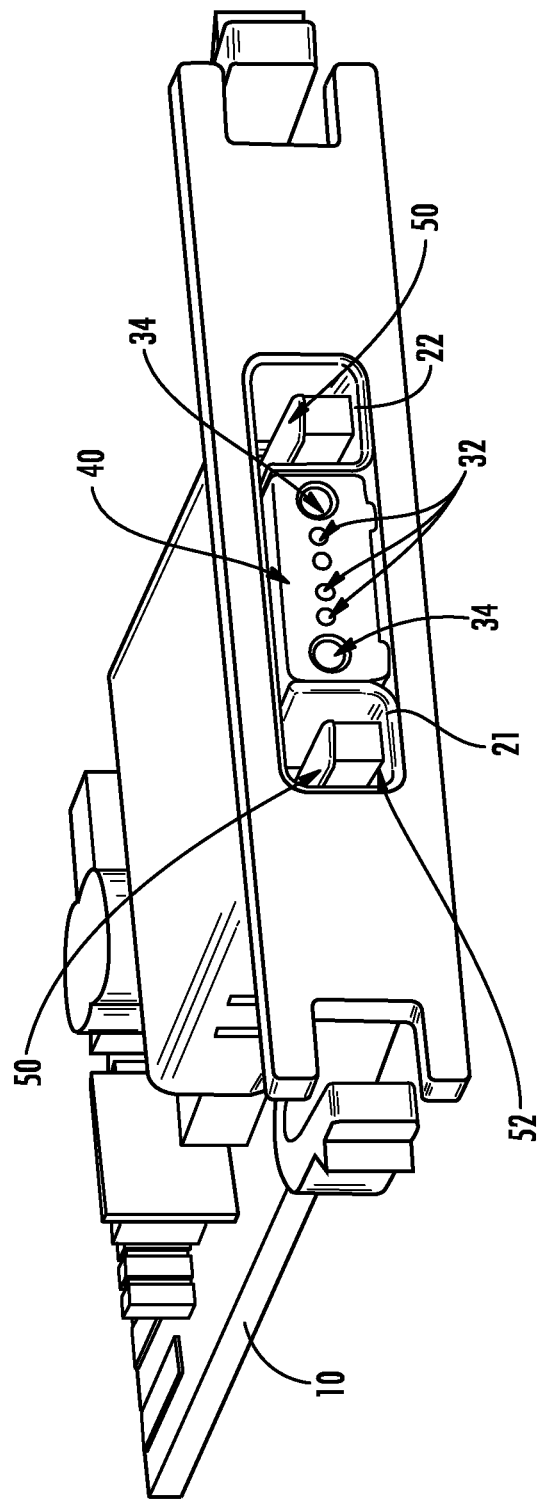

FIGS. 1 and 2 are perspective views of an explanatory optical transceiver module 100 according to the concepts disclosed. The optical transceiver module 100 shown includes a circuit board assembly 10 for receiving and transmitting optical signals, a connector shell 20 attached to a circuit board 12 of the circuit board assembly 100, and a faceplate 30. As shown, the circuit board 12 is disposed outside the connector shell 20, and faceplate 30 has at least one attachment features 32 for securing the optical transceiver module 100 to a device. On the other hand, conventional optical transceivers have an outer shell (i.e., a cage) that surrounds and protects the components of the module while also defining the footprint of the device. These outer shells (i.e., cages) of the conventional optical transceivers are bulky and have a relatively large footprint. Often these shells of the conventional optical transceivers are also incorporated as part of the connection feature when inserting the conventional optical transceiver into a port for connectivity making them even larger. Thus, the concepts disclosed provide an advantage over conventional optical transceiver modules.

As shown, circuit board 12 has a plurality of electrical contacts 16 disposed thereon for making electrical connections when the optical transceiver module 100 is installed into a port of a device. The circuit board assembly 10 includes one or more active components 14 (FIG. 3) such as photodiodes, VCSELs or the like for transmitting and/or receiving light signals to and from and optical modules 40 such as a TIR module. Circuit board assembly 10 may also include other components such as laser drivers, retiming circuits and the like for supporting the electrical-to-optical and optical-to-electrical conversions. The active components 14 may be electrically attached and/or mounted to the circuit board 12 in any suitable manner such as via a leadframe or directly onto the circuit board 12 depending the specifics of the design. The optical module 40 is used for transmitting signals to/from the active components 14 of the circuit board assembly 10.

By way of example, an optical transceiver modules disclosed herein may use an optical module such as a total internal reflection (TIR) module formed as a molded part for aligning optical paths of a mating interface of the optical module with active optical components such as photodiodes and/or VCSELs on the circuit board and coupling the light signal to these active components 14. Stated another way, the active components 14 are aligned with the desired portions of the optical module such as lenses of the TIR module for creating transmit and receive channels in the TIR module and directing light to and from the optical transceiver module/connector interface.

The optical transceiver modules disclosed may also optionally include one or more electrical contacts for transmitting electrical signals, power or the like in addition to transmitting the optical signals. In the optical transceiver module 100 illustrated, the connector shell 20 is attached to the circuit board assembly 10 so that the circuit board 12 is disposed outside the connector shell 20. This connector shell 20 supports an optional electrical interface disposed therein having one or more electrical contacts 50. Although, the electrical contacts 50 in this embodiment are wiping contacts, the electrical contacts may have any suitable configuration as desired such as pins or spring contacts and the connector shell may be modified as needed for the given electrical contact configuration.

In this embodiment, a first electrical contact 50 is disposed within a first lobe 21 of the connector shell 20 and a second electrical contact 50 is disposed within a second lobe 22 of the connector shell 20. The first lobe 21 and second lobe 22 are separated by a pocket 23 of the connector shell 20 with the optical interface (e.g., optical module) disposed within the pocket 23; however, other optical transceiver module embodiments can have other configurations for the optical/electrical interfaces if desired. Specifically, a first electrical contact 50 is disposed within a first lobe 21 and a second electrical contact 50 is disposed within a second lobe 22. The first and second electrical contacts 50 are disposed on respective first and second rails 52. Further, TIR module 40 (e.g., the optical module) is disposed within the pocket 23 of the connector shell 20 when the optical transceiver module 100 is assembled. Thus, the optical interface is provided by the optical module 40 and the electrical interface is provided by the first and second electrical contacts 50 disposed on respective first and second rails 52 of the optical transceiver module.

Optical module 40 may have any suitable configuration at the mating surface for optical transmission of signals. By way of example, the optical module 40 may have lenses that are integrally formed at the mating surface of the module with or without a protective cover or may include a plurality of gradient index fiber (GRIN) lenses, optical fibers or the like disposed within bores of the optical module 40 for channeling light signals to/from the active devices of the circuit board assembly 10. As shown in this embodiment, the optical module 40 has four waveguide bores 41 for receiving the gradient index fiber (GRIN) lenses, optical fibers or the like in bores for channeling optical (i.e., light) signals. Other variations of the optical module/optical transceiver module may have any suitable number of optical channels such as two, six or eight. The optical module 40 may also have optional guide pin bores 43 (i.e., the larger bores) disposed outward of the waveguide bores 41 on the TIR module. Guide pin bores 43 are used for providing alignment with a complimentary plug; however, the connector shell 20 may be used for providing proper alignment with the complimentary plug instead of guide pins.

Moreover, the optical module 40 may also include one or more lenses (not numbered) on a lower surface used for collimating or focusing the light from the transmitter like a VCSEL into the fiber, and from the fiber into the receiver channel such as a photodiode. Thus, the optical transceiver modules disclosed can have a relatively small form factor making them suitable for use with small consumer devices and the like. Likewise, other structure and/or arrangements of the optical transceiver modules disclose herein allows a compact form factor.

In this embodiment, the optical module 40 is configured as a TIR module that includes an optical turn or total-internal reflection TIR surface 42 (or mirror) to redirect the light path about 90 degrees (i.e., turn the light in a folded pathway), thereby allowing a relatively small form factor for the optical transceiver module since the active components may be located on a circuit board aligned with the receptacle/plug insertion direction. The TIR surface 42 on the TIR module is an interface between two different materials that reflects the light because the interface such as between air and the polymer of the TIR module have two different indexes of refraction, thereby causing the light to reflect off of the TIR surface 42 and change the direction of the light by reflecting internally within the TIR module. The concepts disclosed may also be used with optical modules that do not turn the optical signals, but instead pass the optical signals in-line (e.g., straight through) to the active components. For instance, the active components may be mounted on a lead-frame that is attached to the circuit board 12 and the optical module is aligned for transmitting optical signals to/from the active components on the lead-frame.

Figure 3:
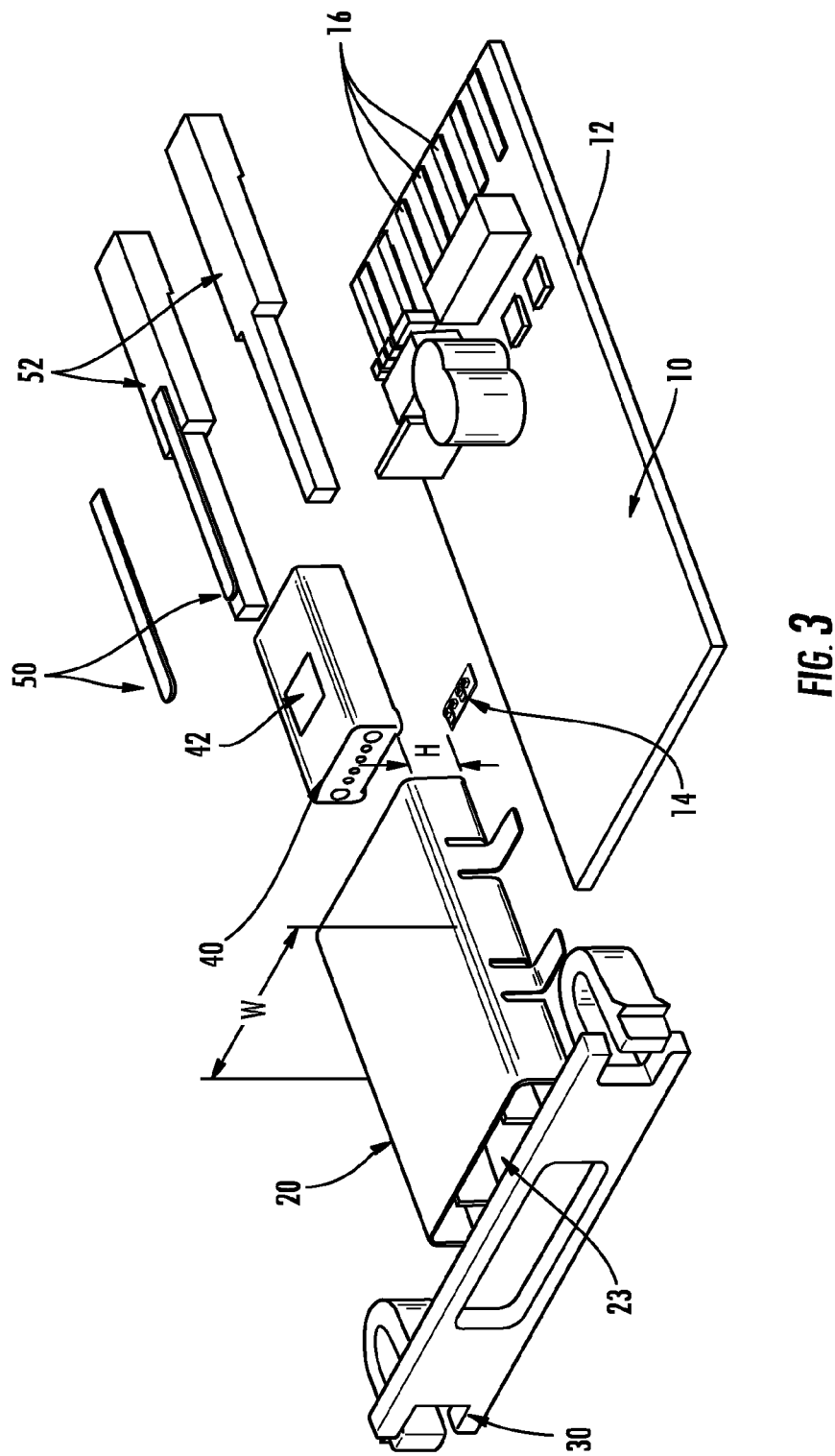
FIG. 3 is a partially exploded view of the optical transceiver module of FIGS. 1 and 2.

FIG. 3 is a partially exploded view of the optical transceiver module 100 showing the details and construction of the module. As shown, the TIR module has a TIR mirror or surface 42 for turning the optical signal from the optical waveguides within in the waveguide bores 41 toward the active optical components 14 located under the TIR module for optical coupling to the same. When assembled the TIR module sits within the pocket 23 of the connector shell so that it is disposed between the circuit board 12 and the connector shell 20 and between the first lobe 21 and second lobe 22. Also the electrical contacts 50 are shown on the rails 52 and then are configured for electrical contact with the circuit board assembly 10. Rails 52 are formed from a dielectric material for insulating the electrical contacts 50 from the connector shell 20.

Figure 4:
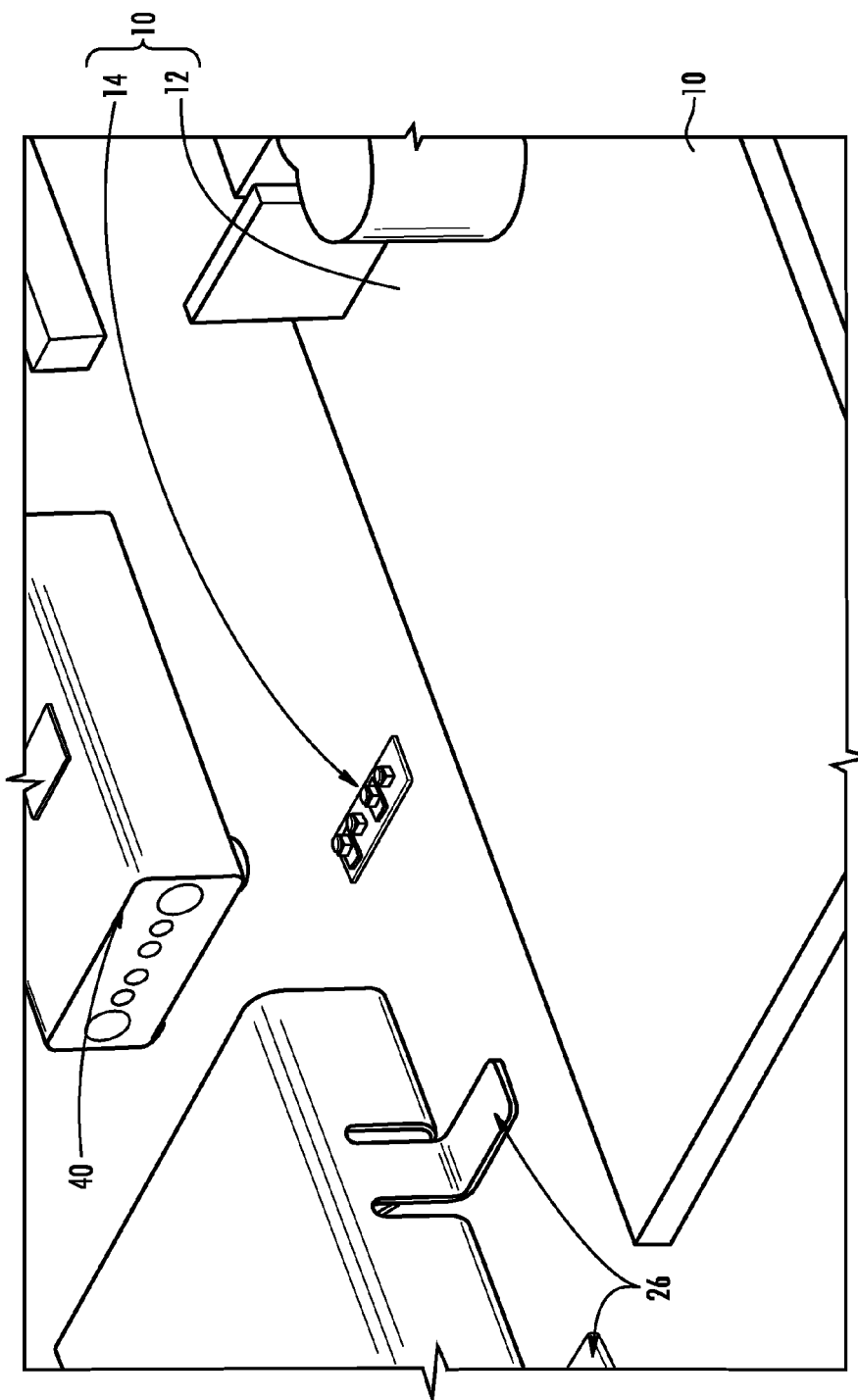
FIG. 4 is a close-up view of the partially exploded optical transceiver module of FIGS. 1 and 2.

FIG. 4 is a partially exploded close-up view of the optical transceiver module 100. Specifically, FIG. 4 shows the relationship of the optical module 40 and the active optical components 14 relative to the circuit board 12. The TIR module has a plurality of lenses (not visible) on the bottom surface that are aligned above the active optical components 14 when assembled for coupling the light signals to and from the lenses of the TIR module with the active optical components 14 (i.e., photodiodes and VCSELs). In this embodiment, the active optical components 14 are arranged on a leadframe and attached to the circuit board 12 of the circuit board assembly 10, but may be individually mounted on the circuit board as desired. Also the circuit board 12 may include mounting features for aligning the active optical components 14 and/or optical module 40 as desired.

As shown the connector shell 20 has one or more mounting tabs 26 for securing the connector shell 20 to a planar surface of the circuit board 12 (i.e., the connector shell sits on top of the circuit board) unlike conventional optical transceiver module, which have the circuit board disposed within or partially within the connector shell of the transceiver. The connector shell 20 has a width W that is greater than a height H of the connector shell 20 and arranged so that the width W of the connector shell 20 is substantially parallel with a planar surface of the circuit board 10. The connector shell 20 can have any suitable dimension for height H or width W. By way of example, the height H may be 10 millimeters or less and may be even smaller such as 8.5 millimeters or less as desired for the given device/port size and shape. Consequently, the optical transceiver module 100 disclosed has a compact footprint that can fit into slim consumer electronic devices such as phones, tablets, laptops and the like. Moreover, the mounting tabs 26 may be soldered to the circuit board for grounding the connector shell 20 if desired The connector shell 20 is aligned with the an opening 31 of the faceplate 30 so that a complementary connector can be inserted through the opening 31 of the faceplate 30 and engage the connector shell 20 for making optical and/or electrical connections as desired. Moreover, the faceplate 30 includes at least one attachment feature 32 outboard of the opening 31 on the faceplate 30 for securing the optical transceiver module 100 to a suitable electronic device. In this embodiment, the attachment features 32 shown are shown as resilient arms, but may have any suitable structure such as latches, fasteners like screws, bolts, or the like for securing and retaining the optical transceiver module 100 with the electronic device. Specifically, attachment features 32 are two resilient arms disposed on opposite sides of faceplate 30, but the faceplate or other structure may have a single attachment feature if desired. When inserted into a port of a device, the resilient arms are deflected and then spring back so that latches on the resilient arms lock the optical transceiver module into the port. In other embodiments the attachment features may be disposed on other components of the optical transceiver module such as the connector shell or the circuit board.

Figure 5:
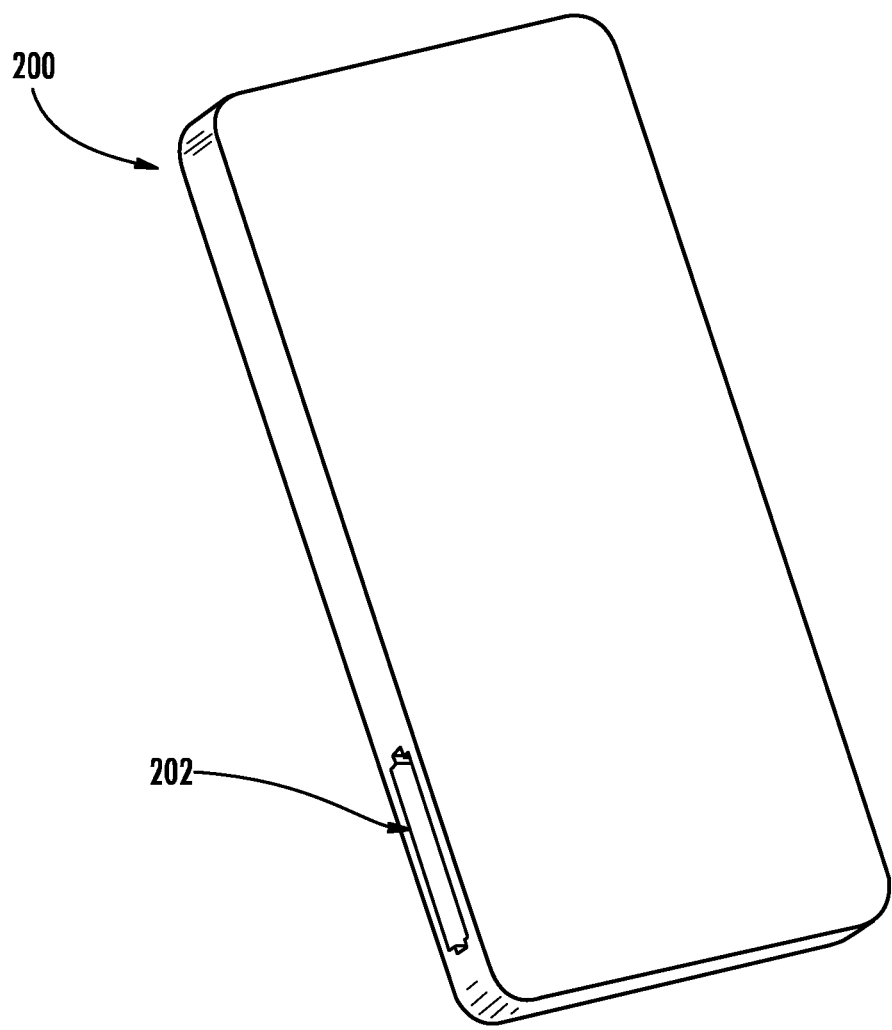
FIG. 5 is a perspective view of an electronic device that includes a port for an optical transceiver module.

FIG. 5 is a perspective view of an electronic device 200 that may receive optical transceiver module 100. The electronic device 200 may be a phone, PDA, laptop, tablet or the like. The electronic device 200 may have a removable face plate 202 that covers a port 204 in the electronic device 200 for receiving the optical transceiver module 100. Thus, the expense of the optical transceiver module 100 not need to be incorporated into the device, but instead the consumer can purchase and add the same and may bear the expense if desired.

Figure 6:
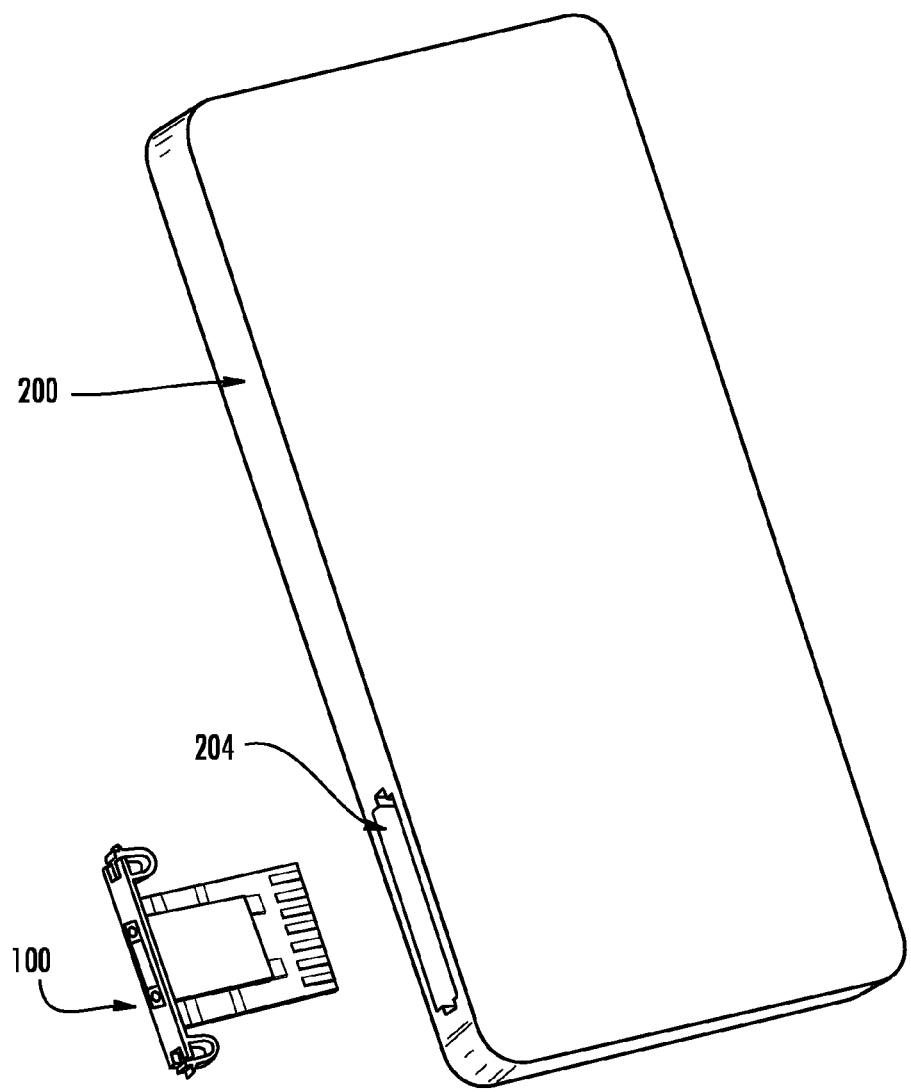
FIG. 6 is a perspective view of the electronic device of FIG. 5 showing the optical transceiver module being aligned for insertion into the port on the electronic device.

FIG. 6 is a perspective view of the electronic device 200 with the faceplate 202 removed and showing the port 204 with the optical transceiver module 100 ready to be inserted in the port 204. The optical transceiver module 100 could have a variety of suitable designs that support different channel counts, data transfer speeds, and connector types to plug into the optical transceiver module 100.

Figure 7:
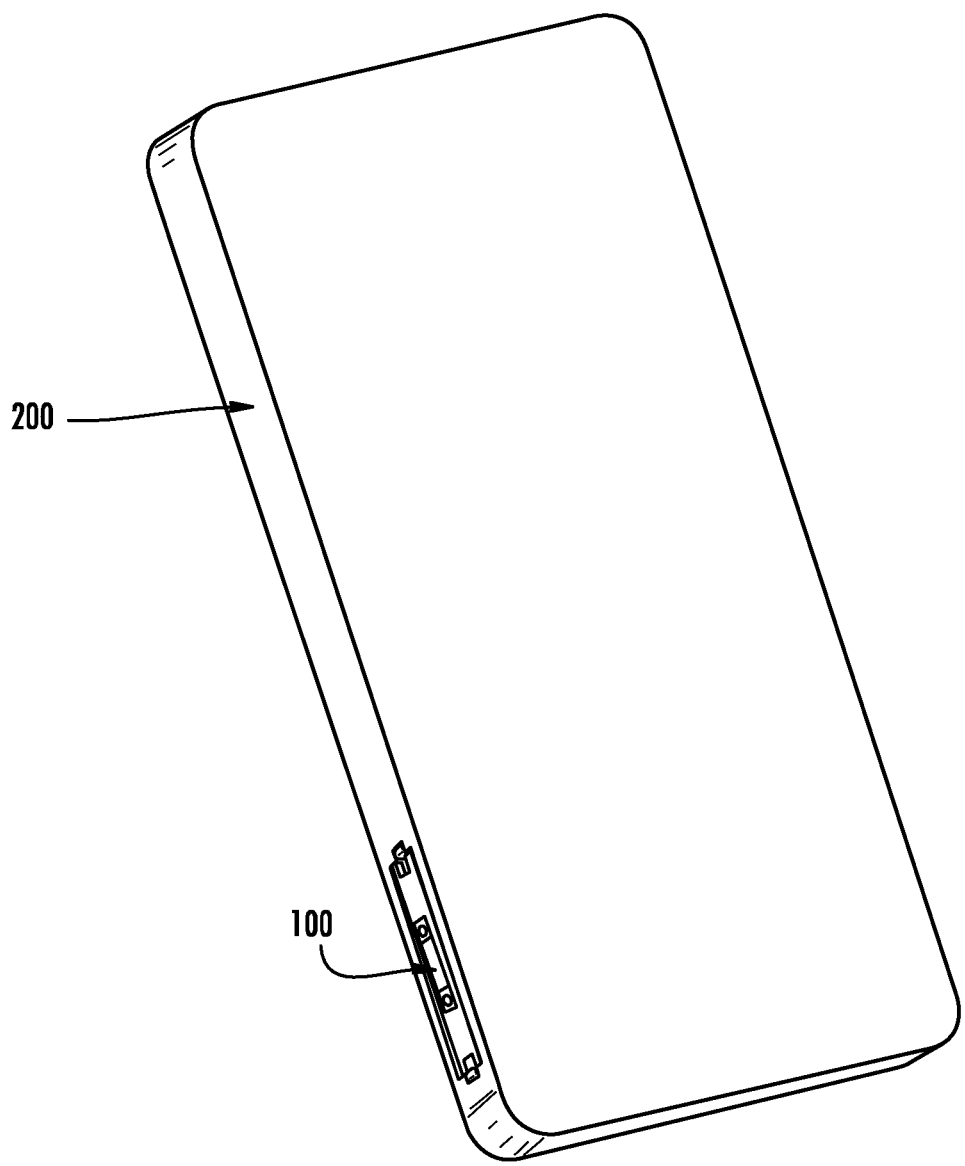
FIG. 7 is a perspective view of the electronic device of FIG. 5 with the optical transceiver module installed into the port on the electronic device.

FIG. 7 is a perspective view of the electronic device 200 with the optical transceiver module 100 installed into the port 204 of the electronic device 200. The electrical contacts 16 on the back of the circuit board 12 engage complimentary electrical contacts in the electronic device 200 for making electrical connections between the optical transceiver module 100 and the electronic device 200 such as for providing power and transferring signals. Consequently, the electronic device 200 is enabled for high-speed data speed such as 5 gigabits/second or higher once installed into port 204.

Figure 8:
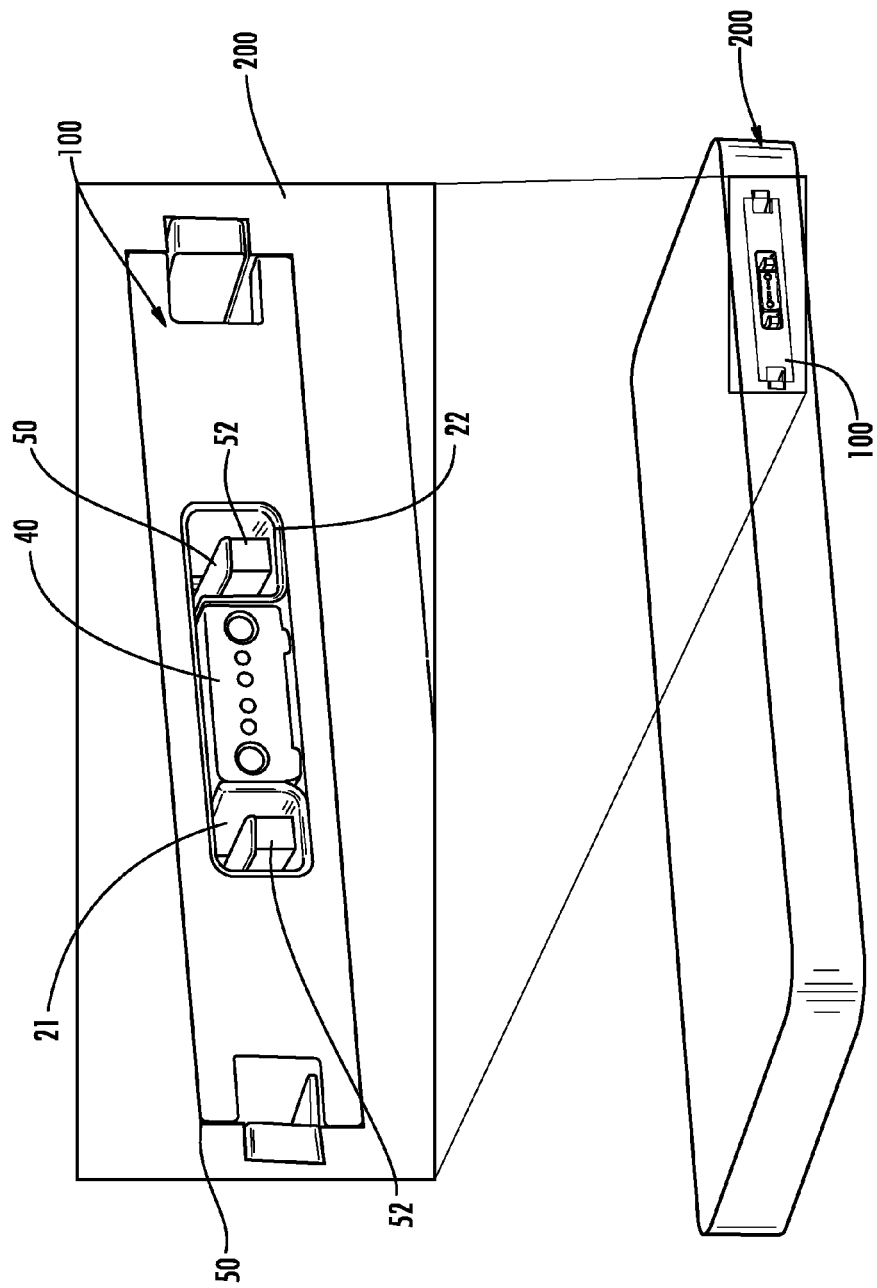
FIG. 8 is a close-up perspective view of the electronic device of FIG. 7 having the optical transceiver module installed into the port of the electronic device.

FIG. 8 is a close-up perspective view of the electronic device 200 with the optical transceiver module 100 installed into the port 204 of the electronic device 200. As shown, the attachment features 32 of the faceplate 30 of the optical transceiver module 100 engage complimentary structure on the electronic device 200 for securing the same. The electronic device 200 is then ready for making optical and/or electrical connectivity with an external device by way of a cable assembly having a complementary connector.

Figure 9:
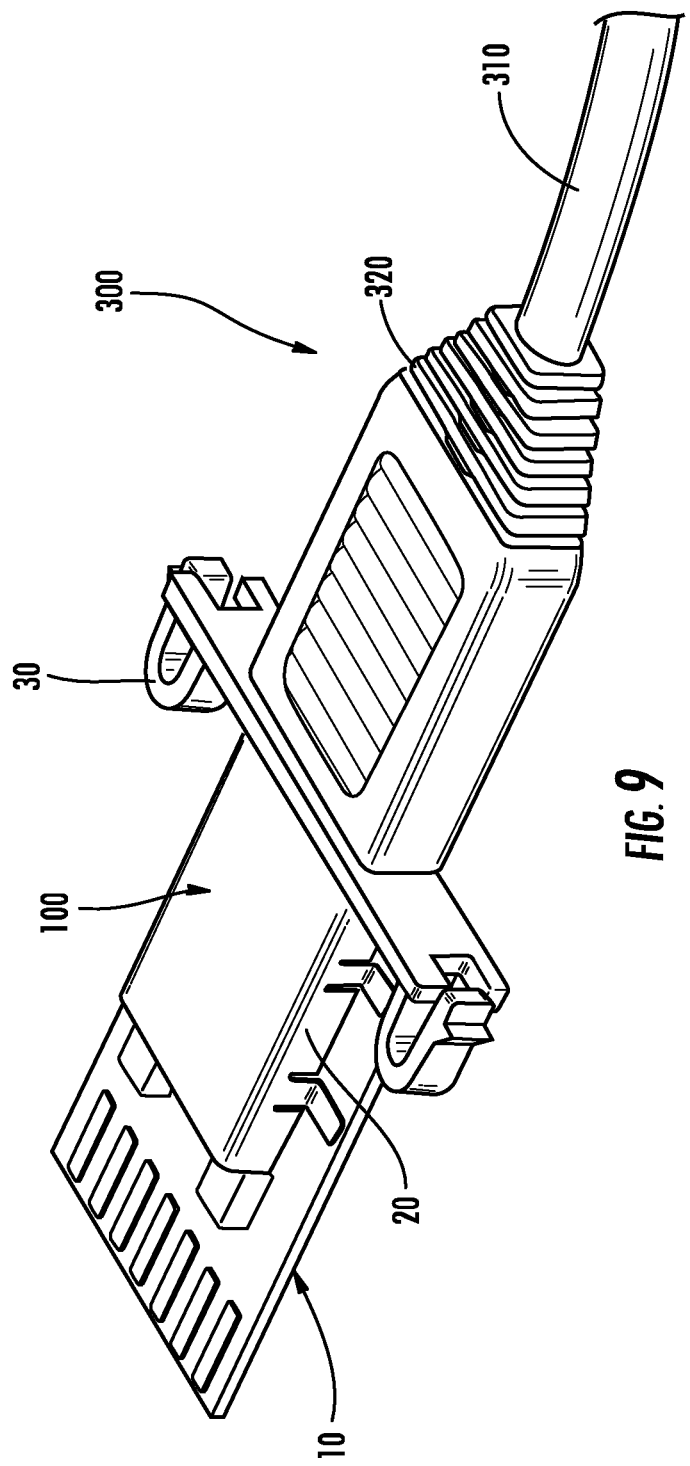
FIG. 9 is a perspective view showing the optical transceiver module mated with a cable assembly with the electronic device removed for clarity.
Figure 10:
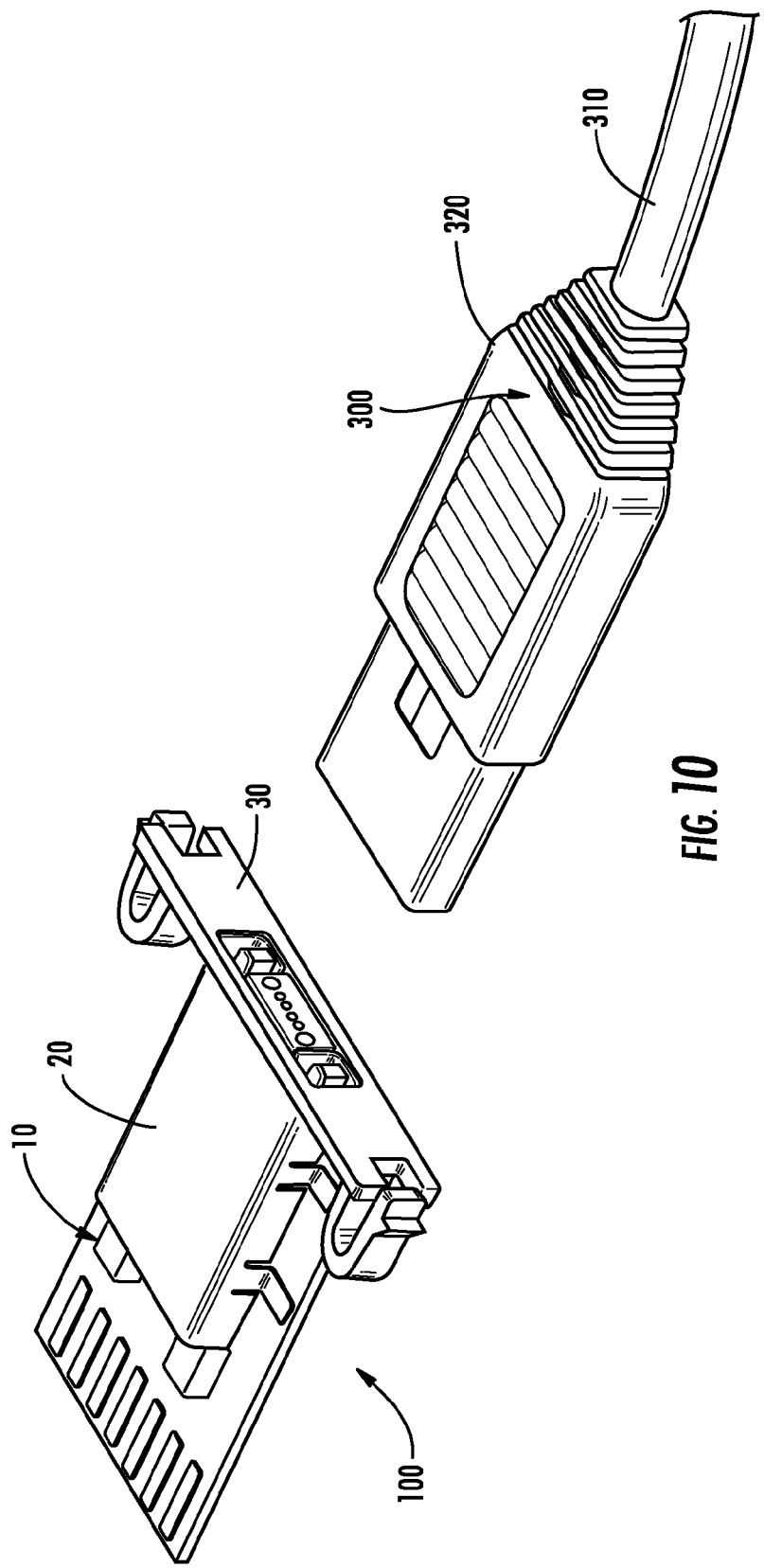
FIGS. 10 and 11 are various perspective views showing the optical transceiver module and the cable assembly in an unmated state.

FIG. 9 is a perspective view showing the optical transceiver module 100 removed from the electronic device for the purposes of clarity and connected with a cable assembly 300 for optical connectivity. Cable assembly 300 has a complementary passive optical connector 320 attached to a fiber optic cable 310. Fiber optic cable 310 of this embodiment also includes electrical conductors in electrical communication with electrical contacts of connector 320. FIG. 10 is a perspective view showing the optical transceiver module 100 again removed from the electronic device for the purposes of clarity and prior to connection with a cable assembly 300.

Figure 11:
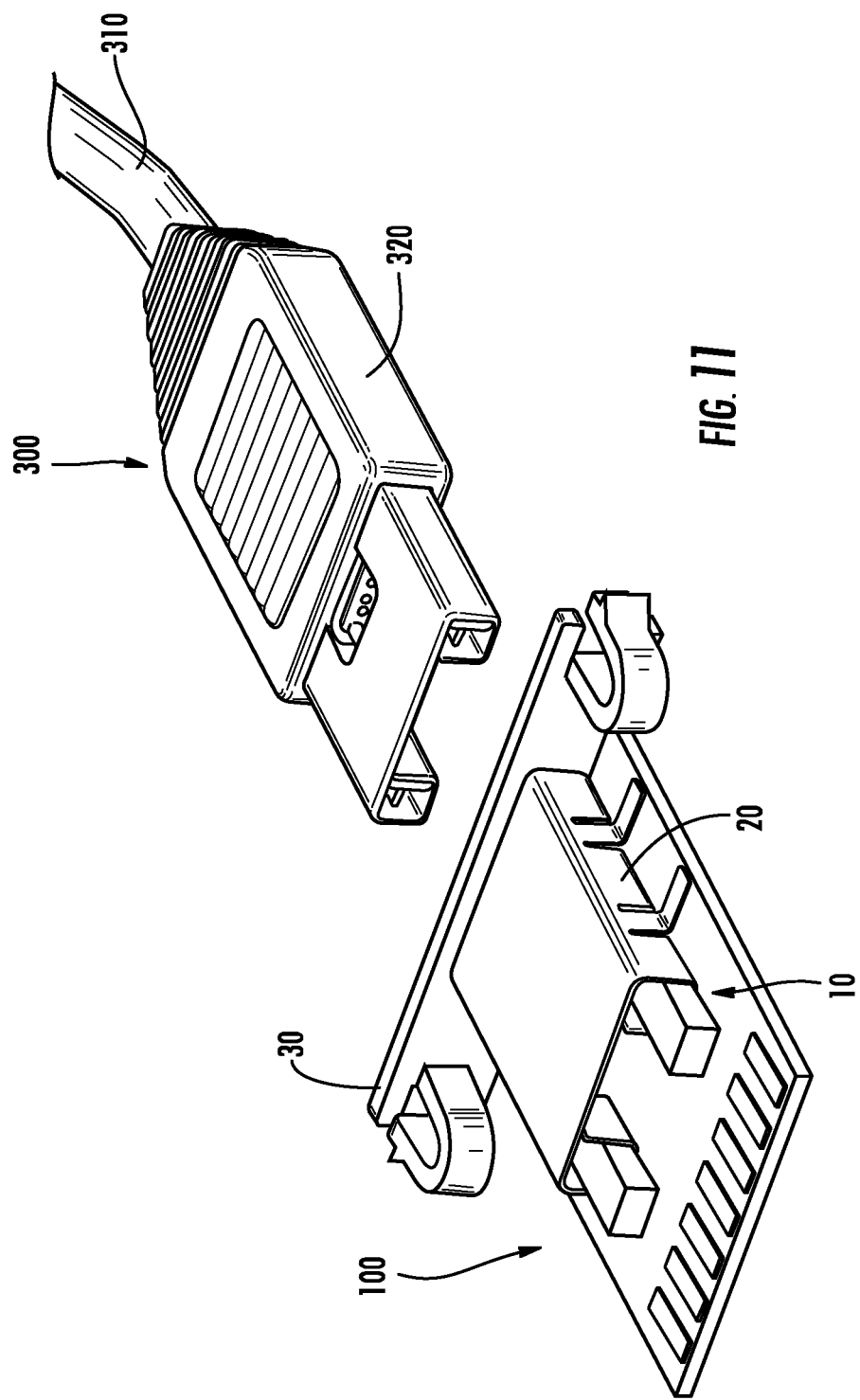

FIG. 11 is a perspective view showing a reverse angle view showing the optical transceiver module 100 removed from the electronic device for the purposes of clarity and prior to connection with cable assembly 300 having a complementary connector 320. Shown is the dual "lobe" connector shell design of complimentary connector. This dual lobe geometry of the design provides high stiffness in very small height packages and aperture in the shell allows for simple cleaning of the optical surfaces if needed. However, other designs for the connector shell, other components and/or arrangements are possible using the concepts disclosed.

Figure 12:
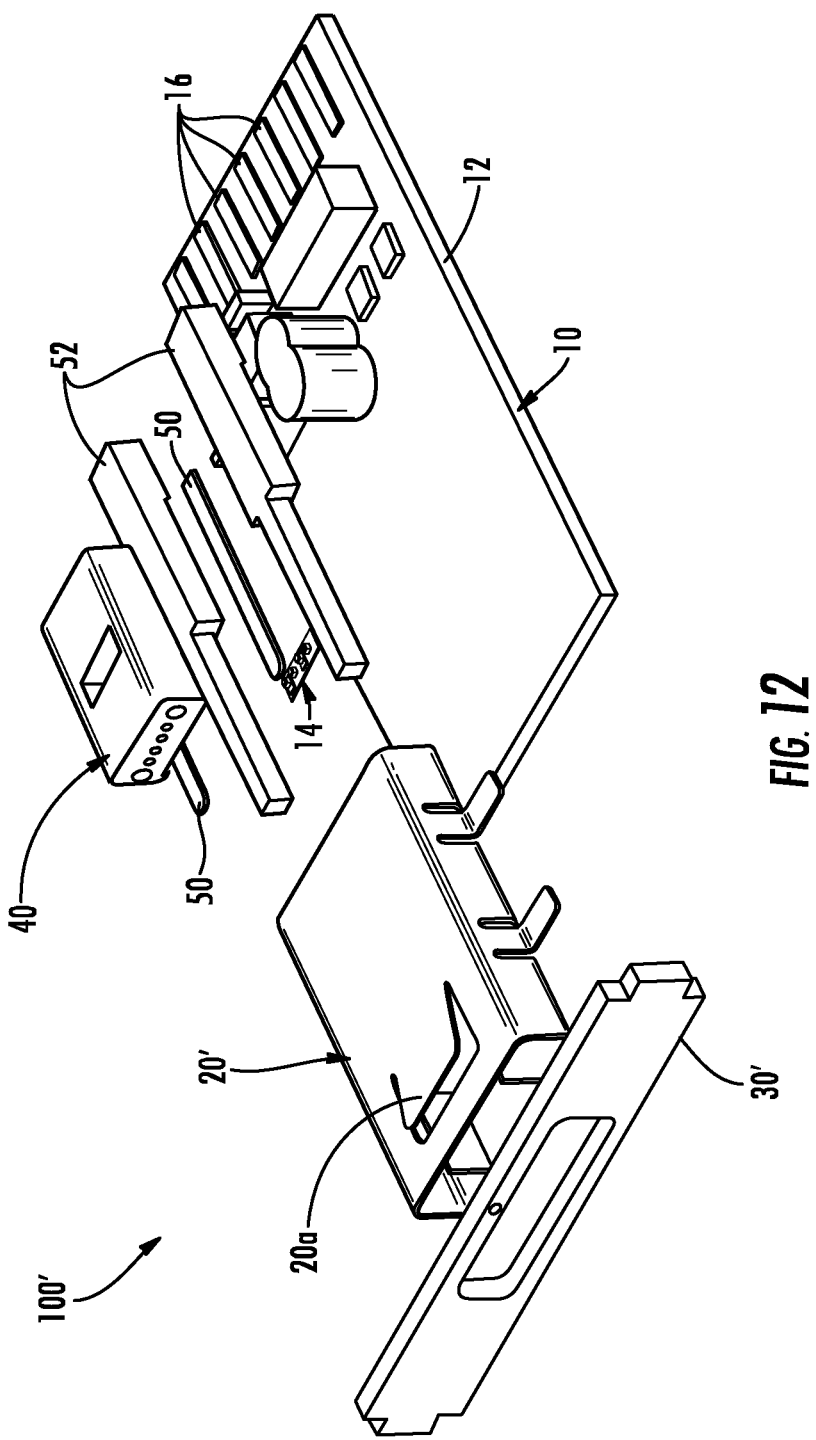
FIG. 12 is a partially exploded view of another optical transceiver module having an alternate attachment feature for securing it to the port of a device.

By way of example, the connector shell may have features or structure for securing the optical module to the port of a device. FIG. 12 is a partially exploded view of another optical transceiver module 100' similar to optical transceiver module 100, but having an attachment feature that is disposed on a connector shell 20' instead of being a portion of the faceplate. Specifically, connector shell 20' includes an attachment feature 20a configured as a tab formed by the connector shell for securing it to the port of a device. As shown, the tab is formed from the shell and sprung to an upward position so that it may be deflected and attached in the port of the device. Since connector shell 20' secures the optical transceiver module 100' to the device, a faceplate 30' as shown need not have attachment features for securing the module, but merely needs to secure itself. For instance, the faceplate 30' can be secured using a snap-fit, an adhesive, or the like. However, the faceplate may still have resilient arms such as faceplate 30 for attachment/securing if desired.

Figure 13:
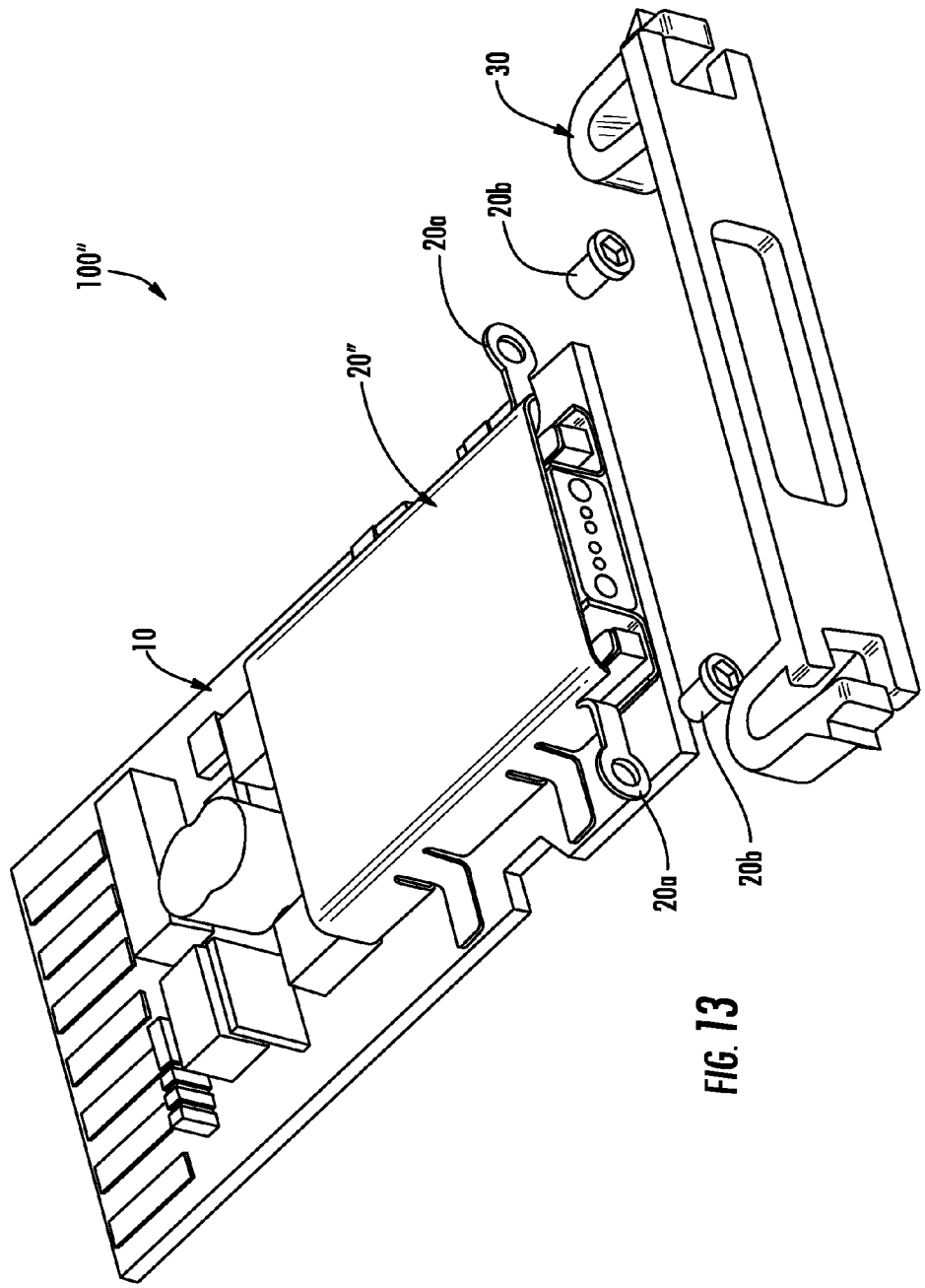
FIGS. 13 and 14 are perspective views showing yet another optical transceiver module having yet another attachment feature for securing it to the port of a device.
Figure 14:
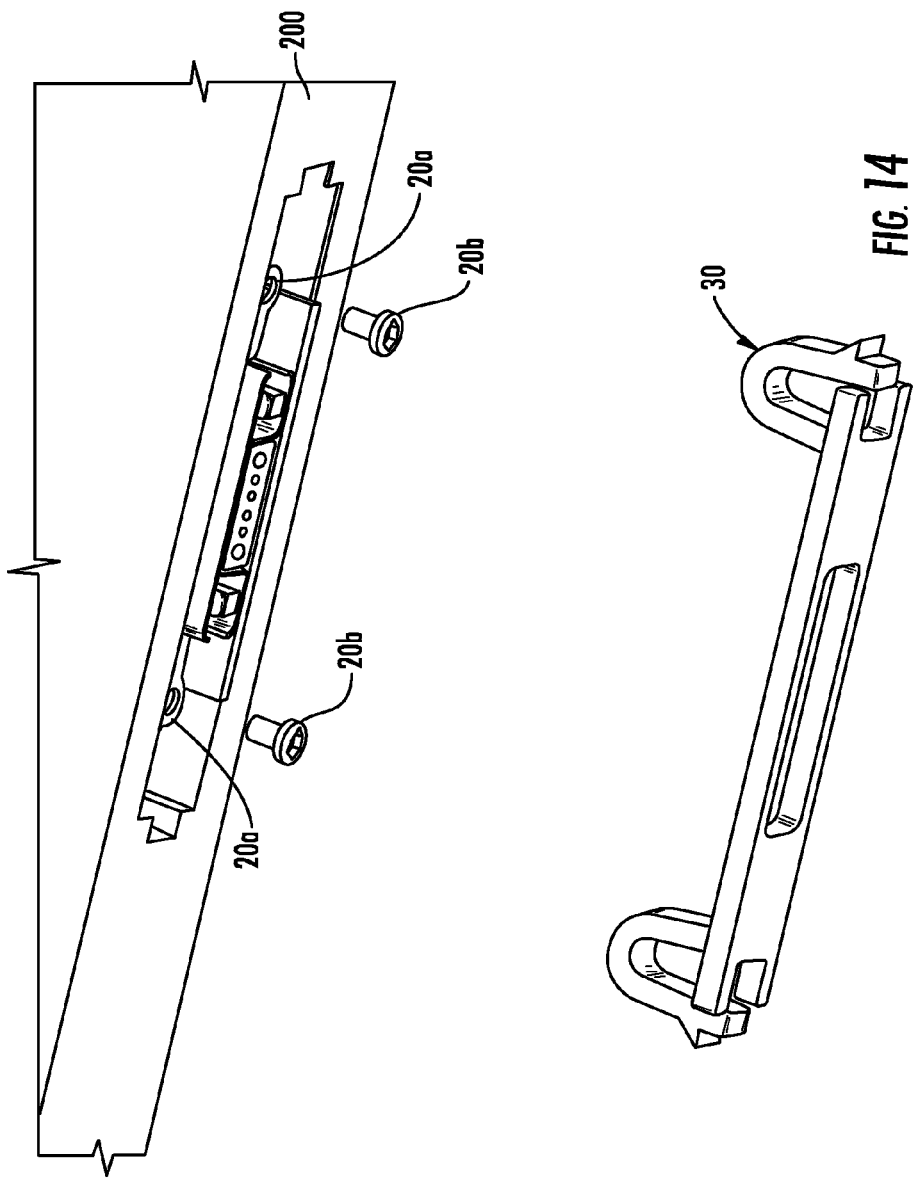

Still other variations are possible for the optical transceiver module. FIGS. 13 and 14 are perspective views showing optical transceiver module 100" similar to optical transceiver module 100, but having an attachment feature that is disposed on a connector shell 20' instead of being a portion of the faceplate. As best shown in FIG. 13, connector shell 20" includes an attachment feature 20a configured as a tab formed by the connector shell for securing it to the port of a device. As shown, first and second tabs are formed from the shell and sprung to respective sides. The first and second tabs also include respective openings for receiving fasteners 20b for attaching the optical transceiver module to the port of the device. This embodiment uses faceplate 30 having resilient arms as shown for securing the faceplate to the device 200. FIG. 14 depicts optical transceiver module 100" inserted into the port of device 200 so that fasteners may be inserted into the openings of the tabs and tightened.

Figure 15:
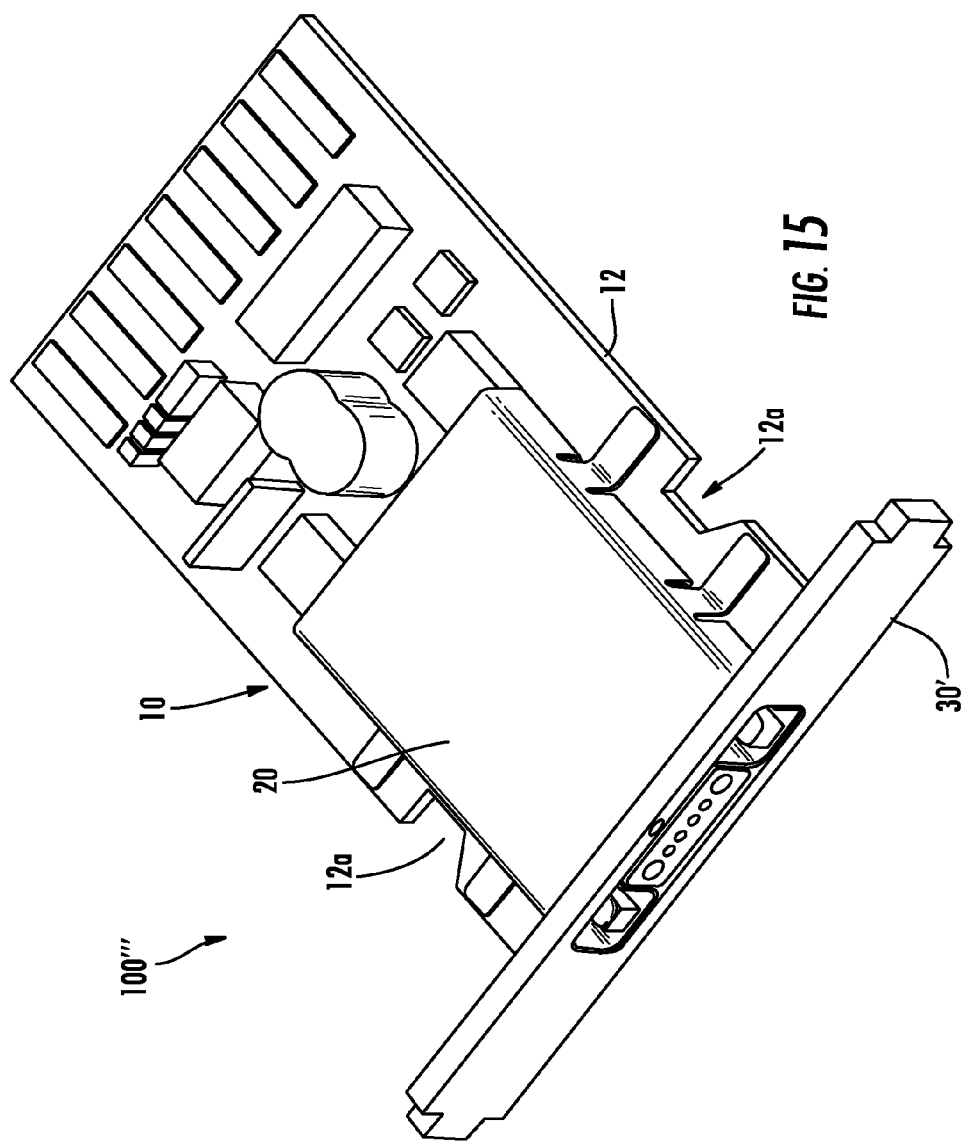
FIG. 15 is a perspective view of still another optical transceiver module having a different attachment feature for securing it to the port of a device.

FIG. 15 is a perspective view of still another optical transceiver module 100''' similar to optical transceiver module 100, but having a different attachment feature for securing it to the port of a device. In this embodiment, circuit board 12 of includes one or more attachment features 12a configured as latches or notches in the circuit board that may engage structure within the port of the device such as resilient fingers for holding the module. Faceplate 30' can be secured using a snap-fit, an adhesive, or the like or may be attached to the module.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical transceiver module, comprising:
   a circuit board assembly for receiving and transmitting optical signals, the circuit board assembly including a circuit board;
   a connector shell attached to the circuit board assembly so that the circuit board is disposed outside the connector shell, the connector shell having a first lobe and a second lobe separated by a pocket; and
   a faceplate.

2. The optical transceiver module of claim 1, the connector shell arranged so that an open side of the pocket is adjacent the circuit board.

3. The optical transceiver module of claim 1, a total internal reflection (TIR) module disposed in the pocket of the connector shell.

4. The optical transceiver module of claim 3, the TIR module including a plurality of GRIN lenses.

5. The optical transceiver module of claim 1, a first electrical contact disposed within the first lobe and a second electrical contact disposed within the second lobe.

6. The optical transceiver module of claim 5, the first electrical contact disposed on a first rail and the second electrical contact disposed on a second rail.

7. The optical transceiver module of claim 1, the connector shell having a width that is greater than a height of the connector shell, wherein the width of the connector shell is substantially parallel with a planar surface of the circuit board.

8. The optical transceiver module of claim 1, the circuit board assembly including a photodiode and a VCSEL.

9. The optical transceiver module of claim 1, the faceplate or the connector shell having at least one attachment feature selected from the group of a resilient arm, a tab, a latch, or a fastener.

10. The optical transceiver module of claim 1, being a portion of an electronic device.

11. An optical transceiver module, comprising:
- a circuit board assembly for receiving and transmitting optical signals, the circuit board assembly including at least one VCSEL and at least one photodiode along with a circuit board;
- a connector shell attached to the circuit board assembly so that the circuit board is disposed outside the connector shell, the connector shell having a first lobe and a second lobe separated by a pocket;
- a total internal reflection (TIR) module disposed in the pocket of the connector shell, wherein the TIR module includes a plurality of GRIN lenses; and
- a faceplate having at least one attachment feature for securing the optical transceiver module.

12. The optical transceiver module of claim 11, the connector shell arranged so that an open side of the pocket is adjacent the circuit board.

13. The optical transceiver module of claim 11, a first electrical contact disposed within the first lobe and a second electrical contact disposed within the second lobe.

14. The optical transceiver module of claim 13, the first electrical contact disposed on a first rail and the second electrical contact disposed on a second rail.

15. The optical transceiver module of claim 11, the connector shell having a width that is greater than a height of the connector shell, wherein the width of the connector shell is substantially parallel with a planar surface of the circuit board.

16. The optical transceiver module of claim 11, the at least one attachment feature of the faceplate being a resilient arm, a latch, or a fastener.

17. The optical transceiver module of claim 11, being a portion of an electronic device.

18. A method for making an optical transceiver module, comprising:
- providing a circuit board assembly having a circuit board and one or more active components;
- aligning an optical module so it is in optical communication with one or more active components; and
- attaching a connector shell to the circuit board assembly so that the circuit board is disposed outside the connector shell, a first electrical contact is disposed within a first lobe of the connector shell, and a second electrical contact is disposed within a second lobe of the connector shell.

19. The method of claim 18, further comprising the attaching the connector shell so that a pocket of the connector shell is disposed about the optical module.

20. The method of claim 18, further including attaching a plurality of GRIN lenses to the optical module.

\* \* \* \* \*